(12) United States Patent
Niu et al.

(10) Patent No.: US 9,561,828 B2
(45) Date of Patent: Feb. 7, 2017

(54) BUS

(71) Applicants: BYD COMPANY LIMITED, Shenzhen (CN); SHENZHEN BYD AUTO R&D COMPANY LIMITED, Shenzhen (CN)

(72) Inventors: Yuecong Niu, Shenzhen (CN); Wang Peng, Shenzhen (CN); Yichao Wu, Shenzhen (CN); Peng Yu, Shenzhen (CN)

(73) Assignees: BYD COMPANY LIMITED, Shenzhen, Guangdong (CN); SHENZHEN BYD AUTO R&D COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 14/845,105

(22) Filed: Sep. 3, 2015

(65) Prior Publication Data

US 2016/0090134 A1    Mar. 31, 2016

(30) Foreign Application Priority Data

Sep. 30, 2014 (CN) .......................... 2014 1 0524061

(51) Int. Cl.

| *B62D 61/10* | (2006.01) |
| *B62D 47/02* | (2006.01) |
| *B60K 1/04* | (2006.01) |
| *B60L 11/18* | (2006.01) |
| *B62D 21/18* | (2006.01) |
| *B60G 21/055* | (2006.01) |

(52) U.S. Cl.

CPC .......... *B62D 47/025* (2013.01); *B60G 21/055* (2013.01); *B60K 1/04* (2013.01); *B60L 11/18* (2013.01); *B62D 21/18* (2013.01); *B60G 2202/1524* (2013.01); *B60G 2300/14* (2013.01); *B60K 2001/0405* (2013.01); *B60K 2001/0411* (2013.01); *B60K 2001/0416* (2013.01); *B60K 2001/0438* (2013.01); *B60Y 2200/143* (2013.01); *B60Y 2200/1432* (2013.01)

(58) Field of Classification Search

CPC .......... B60D 5/00; B62D 53/02; B62D 47/025
USPC ........................................ 180/22, 235, 68.5
See application file for complete search history.

(56) References Cited

U.S. PATENT DOCUMENTS

| 4,405,143 A * | 9/1983 | Rosenkrands ........... B60D 5/00 |
| | | 105/18 |
| 4,487,425 A * | 12/1984 | Taylor ...................... B60T 7/12 |
| | | 180/271 |

(Continued)

*Primary Examiner* — Toan To
(74) *Attorney, Agent, or Firm* — Morgan, Lewis & Bockius LLP

(57) ABSTRACT

A bus is provided, including: a frame assembly including a front frame, a rear frame and a hinge turntable therebetween; carriages including a front carriage having a front carriage body and a front carriage floor, and a rear carriage having a rear carriage body and a rear carriage floor; a front axle and a middle axle disposed at a bottom of the front frame; a rear axle disposed at a bottom of the rear frame; a first group of battery packs including a first battery pack disposed within a rear cabin in the rear of the rear carriage body and a second battery pack disposed on the rear frame; a second group of battery packs disposed on upper surfaces of top roof of the front and rear carriage bodies; a third group of battery packs disposed on the front carriage floor and between the front axle and the hinge turntable.

20 Claims, 7 Drawing Sheets

(56) References Cited

U.S. PATENT DOCUMENTS

| | | | | |
|---|---|---|---|---|
| 5,148,886 | A  * | 9/1992 | Parsons | B60K 28/14 180/275 |
| 5,833,295 | A  * | 11/1998 | Farlow, Jr. | B60P 3/14 296/22 |
| 7,191,862 | B2 * | 3/2007 | Wattenburg | B60R 25/00 180/275 |
| 7,338,335 | B1 * | 3/2008 | Messano | B60G 13/14 180/65.22 |
| 2002/0153745 | A1 * | 10/2002 | Messano | B60P 3/34 296/156 |
| 2006/0170188 | A1 * | 8/2006 | Negre | B62D 47/025 280/403 |
| 2006/0237242 | A1 * | 10/2006 | Burke | B60K 6/32 180/23 |
| 2009/0095545 | A1 * | 4/2009 | Crabtree | B60K 25/02 180/53.8 |
| 2010/0276216 | A1 * | 11/2010 | Barry | B60P 3/34 180/14.2 |
| 2012/0195724 | A1 * | 8/2012 | Toebes | B65G 13/00 414/509 |
| 2013/0098263 | A1 * | 4/2013 | Barry | B61F 13/00 105/215.2 |

* cited by examiner

Front
Rear

BUS

CROSS-REFERENCE TO RELATED APPLICATIONS

This application claims priority to and benefits of Chinese Patent Application No. 201410524061.8, filed with the State Intellectual Property Office of P. R. China on Sep. 30, 2014, and the entire content of the above-identified application is incorporated herein by reference.

FIELD

Embodiments of the present disclosure relates to a vehicle, and more particularly to a bus.

BACKGROUND

Commonly, in the related art, power of an electric bus is from batteries; however, due to a space limitation of the bus, arrangement of batteries is a problem which needs to be considered.

SUMMARY

Embodiments of the present disclosure seek to solve at least one of the problems existing in the related art.

Embodiments of the present disclosure provide a bus. The bus according to embodiments of the present disclosure includes: a frame assembly including a front frame, a rear frame and a hinge turntable disposed between the front frame and the rear frame; carriages including a front carriage disposed on the front frame and a rear carriage disposed on the rear frame, the front carriage having a front carriage body and a front carriage floor, and the rear carriage having a rear carriage body and a rear carriage floor; a front axle disposed at a bottom of the front frame, front wheels being disposed at two opposite ends of the front axle respectively; a middle axle disposed at the bottom of the front frame, middle wheels being disposed at two opposite ends of the middle axle respectively; a rear axle disposed at a bottom of the rear frame, rear wheels being disposed at two opposite ends of the rear axle respectively; a first group of battery packs including a first battery pack disposed within a rear cabin in the rear of the rear carriage body and a second battery pack disposed on the rear frame; a second group of battery packs disposed on upper surfaces of top roof of the front carriage body and the rear carriage body; a third group of battery packs disposed on the front carriage floor and between the front axle and the hinge turntable.

With the bus according to embodiments of the present disclosure, since the first group of battery packs and the second group of battery packs are spaced apart from the space in the carriage, an occupation of the space in the carriage by the battery packs is reduced, space for passengers is expanded and comfort of passengers getting on and off is ensured. Moreover, the number of seats for passengers is increased to improve a carrying capacity of the bus, and better views and better visual comfort are provided for passengers and a driver of the bus, thus improving ride-comfort.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
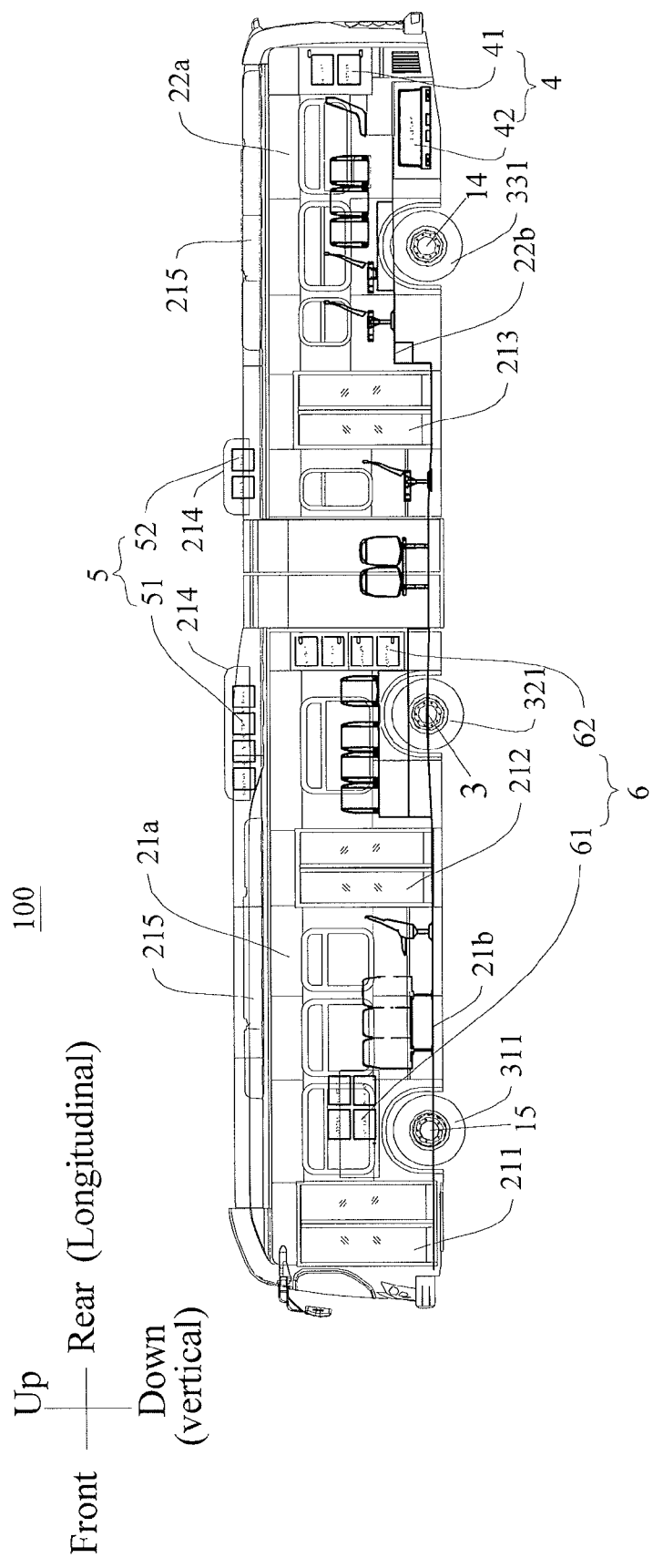
FIG. 1 is a side view of a bus according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it should be understood that, the terms such as "central", "longitudinal", "lateral", "width", "thickness", "above", "below", "front", "rear", "right", "left", "vertical", "horizontal", "top", "bottom", "inner", "outer", "clockwise", "counter-clockwise" should be construed to refer to the orientation as then described or as shown in the drawings. These terms are merely for convenience and concision of description and do not alone indicate or imply that the device or element referred to must have a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two this features, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

A bus 100 according to embodiments of the present disclosure will be described below with reference to FIGS. 1-8. It should be noted that, in the description of the present disclosure, a front and rear direction refers to a length direction of the bus 100, a left and right direction refers to a width direction of the bus 100, an up and down direction refers to a height direction of the bus, a lateral direction also refers to the width direction of the bus, a longitudinal direction also refers to the length direction of the bus and a vertical direction also refers to the height direction of the bus. Further, these directions refer to normal directions when the bus is parked or driving.

As shown in FIGS. 1-9, the bus 100 includes: a frame assembly 1, carriages 2, a front axle 15, a middle axle 3, a rear axle 14, a motor 12, a first group of battery packs 4, a second group of battery packs 5, and a third group of battery packs 6.

Figure 3:
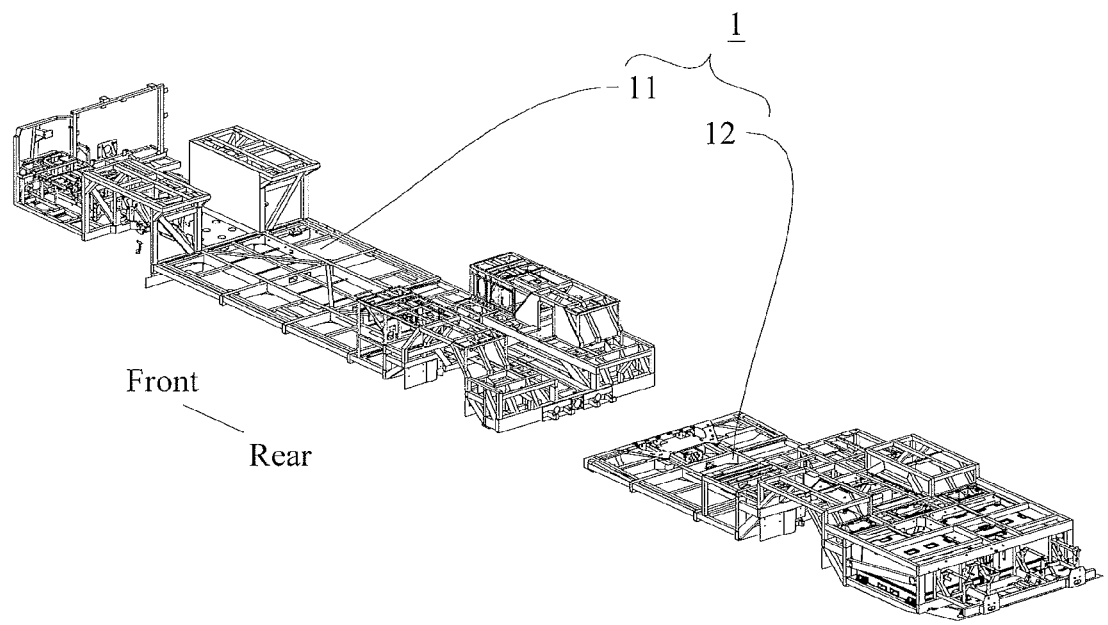
FIG. 3 is a schematic view of a frame assembly of a bus according to an embodiment of the present disclosure.
Figure 9:
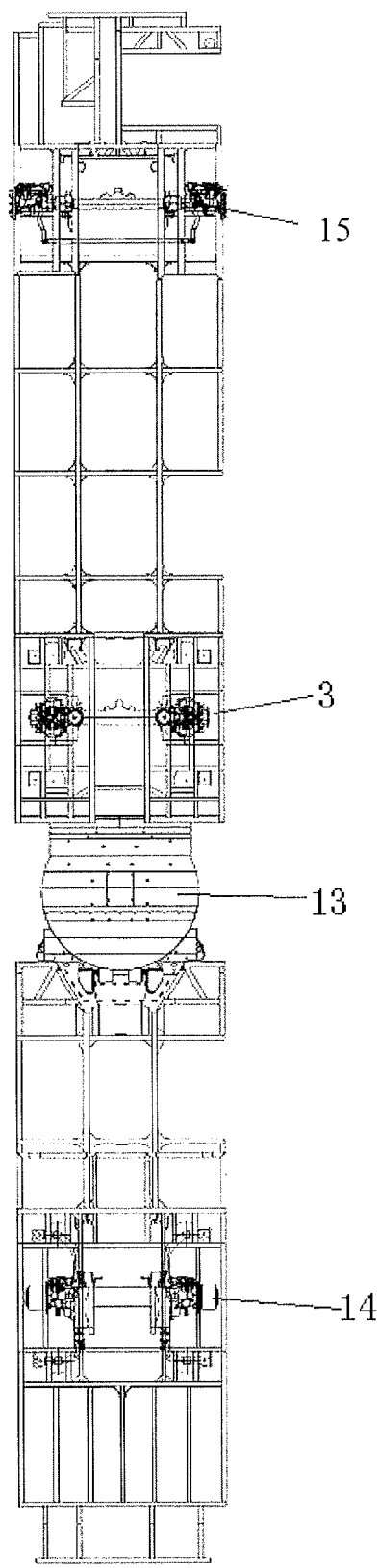
FIG. 9 is a bottom view of a frame assembly of a bus according to an embodiment of the present disclosure.

In some embodiments, as shown in FIGS. 1 and 9, the frame assembly 1 includes a front frame 11, a rear frame 12 and a hinge turntable 13. The hinge turntable 13 is disposed between the front frame 11 and the rear frame 12. As shown in FIG. 3, the hinge turntable 13 is mounted at a hinge turntable mounting position. The hinge turntable 13 is configured to connect the front frame 11 and the rear frame 12. The hinge turntable 13 is also used as a buffer when the bus 100 brakes. Furthermore, the hinge turntable 13 allows the rear frame 12 to tilt at a small angle in a driving direction when the bus 100 arrives at an intersection corner, which avoids a too much offset of a rear end of the bus so as not to have a collision with other vehicles.

In some embodiments, the carriages 2 includes a front carriage 21 disposed on the front frame 11 and a rear carriage 22 disposed on the rear frame 12. The front carriage 21 includes a front carriage body 21a and a front carriage floor 21b, and the rear carriage 22 includes a rear carriage body 22a and a rear carriage floor 22b.

In some embodiments, a front door 211 and a middle door 212 are provided on the front carriage body 21a. A rear door 213 is provided on the rear carriage body 22a. In some embodiments, the middle door 212 may be used as an entrance door of the bus 100, and the front door 211 and the rear door 213 may be used as exit doors of the bus 100, so that passengers can get on the bus 100 from the middle door 212, walk forward and get off the bus 100 from the front door 211, and the passengers can also walk backward after getting on the bus 100 from the middle door 212 and get off the bus 100 from the rear door 213. Therefore, the number of the passengers distributed in the front of the bus 100 is balanced with that of the passengers distributed in the rear of the bus 100, which helps to keep the driving stability of the bus 100. Since both the front door 211 and the rear door 213 are used as the exit doors of the bus 100, the passengers to get off are dispersed and a getting off speed of the passengers is increased, thus providing great convenience for the passengers.

In some embodiments, the front axle 15 and middle axle 3 are disposed at a bottom of the front frame 11 respectively, and the rear axle 14 is disposed at a bottom of the rear frame 12. Front wheels 311 are disposed at two opposite ends of the front axle 15 respectively, and middle wheels 321 are disposed at two opposite ends of the middle axle 3 respectively, and rear wheels 331 are disposed at two opposite ends of the rear axle 14 respectively. In other words, the bus 100 is a six-wheel bus, the front wheels 311 disposed on the front axle 15 and the middle wheels 321 disposed on the middle axle 3 contribute to the driving stability of the bus 100 and provide advantages in carrying passengers (more passengers can be carried). The rear wheels 331 disposed on the rear axle 14 contribute to a steering of the rear end of the bus 100 when the bus is turning.

The motor 12 is configured to drive the front wheels 311, the middle wheels 321 and/or the rear wheels 331. In some embodiments, the bus 100 may be configured as a two-drive vehicle, a four-wheel drive vehicle or a six-drive vehicle. In some embodiments, when the bus 100 is configured as a rear-drive vehicle, the motor 12 may include a left motor and a right motor. The left motor is configured for driving the rear wheel 331 at the left, and the right motor is configured for driving the rear wheel 331 at the right. The bus 100 configured as the two-drive vehicle can effectively reduce energy consumption thereof.

In some embodiments, the first group of battery packs 4 includes a first battery pack 41 and a second battery pack 42. The first battery pack 41 is disposed in a rear cabin disposed in the rear of the rear carriage body 22a and the second battery pack 42 is disposed on the rear frame 12 and adjacent to the rear cabin.

Figure 2:
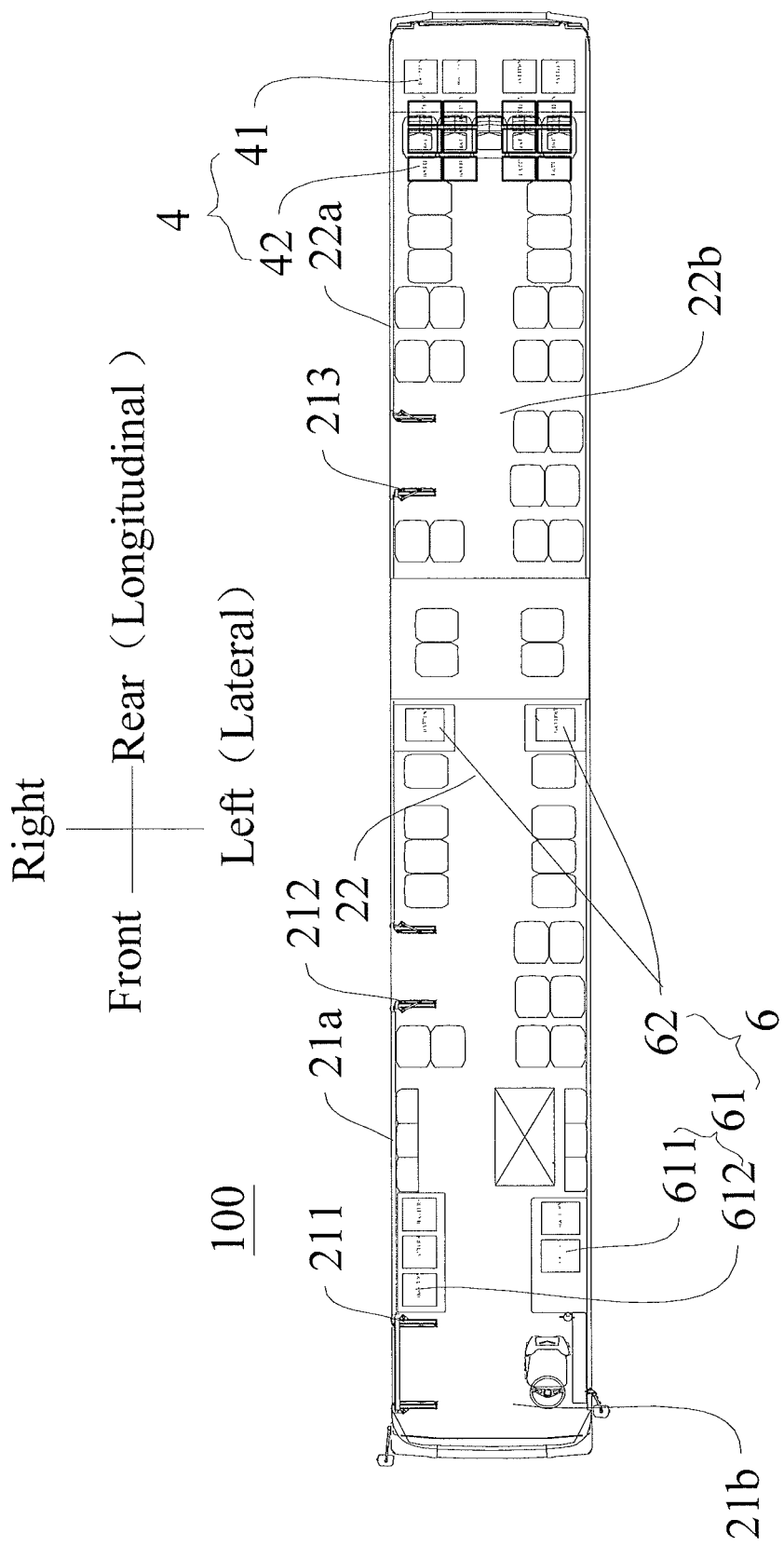
FIG. 2 is a top view of carriages of a bus according to an embodiment of the present disclosure.

In some embodiments, as shown in FIGS. 1-3, the first battery pack 41 includes eight battery modules arranged in two layers in the vertical direction and in four columns in the lateral direction.

In some embodiments, as shown in FIG. 1, the second battery pack 42 is located near the rear axle 14 and under a last row of seats in the rear carriage 22, so that the second battery pack 42 does not occupy space in the carriage used for placing seats for passengers and the second battery pack 42 disposed in the above position is easy to be assembled, disassembled and maintained. In some embodiments, the second battery pack 42 includes twelve battery modules arranged in four columns in the lateral direction and in three rows in the longitudinal direction. Thus, the first battery pack 41 and the second battery pack 42 are arranged uniformly in the lateral direction, which facilitates balance of the bus 100 in the lateral direction. The rear carriage 22 and the frame assembly 1 can protect the first group of battery packs 4, and it is easy to mount and maintain the first group of battery packs 4.

In some embodiments, the second group of battery packs 5 are disposed on upper surfaces of top roof of the front carriage body 21a and the rear carriage body 22a. The third group of battery packs 6 are disposed on the front carriage floor 21b and between the front axle 15 and the hinge turntable 13. The first group of battery packs 4, the second group of battery packs 5 and the third group of battery packs 6 supply power to the motor 12.

In some embodiments, the first group of battery packs 4 and the second group of battery packs 5 are spaced apart from the space in the carriage space respectively, an occupation of the space in the carriage by the battery packs is reduced, space for passengers is expanded and comfort of passengers getting on and off is ensured. Moreover, the number of seats for passengers is increased to improve a carrying capacity of the bus 100, and better views and better visual comfort are provided for passengers and a driver of the bus 100, thus improving ride-comfort.

In some embodiments, the second group of battery packs 5 includes a third battery pack 51 and a fourth battery pack 52. As shown in FIG. 1 and FIG. 2, the third battery pack 51 is disposed on the top roof of the front carriage body 21*a*. When viewed in the vertical direction, the third battery pack 51 is disposed right above the middle axle 3. The fourth battery pack 52 is disposed on the top roof of the rear carriage body 22*a*. When viewed in the vertical direction, the fourth battery pack 52 is disposed between the hinge turntable 13 and the rear axle 14 and adjacent to the hinge turntable 13.

In some embodiments, the third battery pack 51 includes sixteen battery modules arranged in four columns in the lateral direction and in four rows in the longitudinal direction. The four battery pack 52 includes eight battery modules arranged in four columns in the lateral direction and in two rows in the longitudinal direction. Specifically, the third battery pack 51 is symmetrically disposed on the top roof of the front carriage body 21*a* and the fourth battery pack 52 is symmetrically disposed on the top roof of the rear carriage body 22*a*, which may contribute to the balance of the bus 100 and reduce damage to tires.

In some embodiments, the third battery pack 51 and the four battery pack 52 are covered by a battery pack cover 214. In some embodiments, the battery pack cover 214 may further has a chamber for accommodating the battery module, and the battery pack cover 214 covers the top roof of the carriages 2. The battery pack cover 214 is configured as a shelter to protect the battery module, which improves a life of the battery pack and ensures a safety performance of the battery module in use.

In some embodiments, in order to improve the carrying capacity of the top roof of the carriages 2, a battery pack mounting frame may be disposed on each of the top roof of the carriage 2, and the third battery pack 51 and the fourth battery pack 52 may be provided on the battery pack mounting frame respectively, which guarantees mounting stability of the third battery pack 51 and the fourth battery pack 52 and protects the third battery pack 51 and fourth battery pack 52 well.

In some embodiments, as shown in FIGS. 1 and 2, the third group of battery packs 6 includes a fifth battery pack 61 and a sixth battery pack 62.

In the vertical direction, the fifth battery pack 61 is disposed on the front carriage floor 21*b* and right above the front axle 11. In some embodiments, in the lateral direction, the fifth battery pack 61 includes a left battery pack 611 and a right battery pack 612.

The left battery pack 611 is disposed over the front wheel 311 at the left, and includes four battery modules arranged in two rows in the longitudinal direction and in two layers in vertical direction. The right battery pack 612 is disposed over the front wheel 311 at the right, and includes three battery modules arranged in three rows in the longitudinal direction. The right battery pack 612 is arranged in only one layer, which greatly facilitates the driver to see the passengers in a bus station. The left battery pack 611 is arranged in two layers so as to make space for storage boxes and electric appliance, which helps to maximize the space in the carriage.

In some embodiments, the sixth battery pack 62 is disposed between the hinge turntable 13 and the middle axle 3. As shown in FIGS. 1 and 2, the sixth battery pack 62 may be disposed behind a last row of seats of the front carriage 21. The sixth battery pack 62 includes eight battery modules symmetrically arranged with respect to a longitudinal centerline of the bus 100, four battery modules of the sixth battery pack 62 are arranged on one side of the longitudinal centerline of the bus 100 in the vertical direction, and the other four battery modules of the sixth battery pack 62 are arranged on the other side of the longitudinal centerline of the bus 100 in the vertical direction. Therefore, the sixth battery packs 62 are symmetrically arranged in the lateral direction, the number of the battery modules on the left side is the same with that of the battery modules on the right side, and thus load of sixth battery pack 62 is evenly distributed, which avoids occupying the space in the front carriage 21, provides more seats for passengers and ensures the economic benefits of the bus 100.

In some embodiments, in an overall layout of the battery packs of the bus 100, the first group of battery packs 4 are disposed at the rear axle 14 (i.e., a position of the rear wheels 331), and the rear wheels 331 functions as a support for the first group of battery packs 4. The second group of battery packs 5 are arranged adjacent to the middle axe 3 (i.e., a position of the middle wheels 321), and the middle wheels 321 functions as a support for the second group of battery packs 5. The fifth battery pack 61 is disposed at the front axle 15 (i.e., a position of the front wheels 311), and the front wheels 311 functions as a support for the fifth battery pack 61. The sixth battery pack 62 is disposed adjacent to the middle axle 3 (i.e., a position of the middle wheels 321), and the middle wheels 321 functions as a support for the sixth battery pack 62.

In the overall layout of the battery pack, the front wheels 311, the middle wheels 321 and the rear wheels 331 support the second group of battery packs 5, the third group of battery packs 6 and the first group of battery packs 4 correspondingly. Such layout of the battery packs effectively reduces the load of the bus 100 which is caused by the battery packs, and the battery packs are evenly distributed in the longitudinal direction, which may not only help to increase the usage time of the battery packs, but also ensure the driving stability of the bus 100.

In some embodiments, the bus 100 further includes two independent refrigeration systems 215. The refrigeration system 215 includes a compressor, a condenser, a throttling device and an evaporator connected end to end. And as shown in FIG. 1, the two refrigeration systems 215 are disposed on the top roof of the carriage 2. In the vertical direction, one refrigeration system 215 is disposed on the top roof of the front carriage body 21*a* and between the front axle 15 and the middle axle 3, and the other refrigeration system 215 is disposed on the top roof of the rear carriage body 22*a* and above the rear axle 14. Such a layout of the two refrigeration systems 215 doesn't occupy the space in the carriage, but effectively ensures a cooling effect of the space in the carriage and improves the comfort of passengers. In some embodiments, the bus 100 may further include four adjustable air-conditioner vents provided above the driver's seat, so as to reduce a driving fatigue of the driver and improve the driving comfort.

In some embodiments, the bus 100 may further includes two escape exits, and the two escape exits are formed in the top roof of the front carriage body 21*a* and the top roof of the rear carriage body 22*a* respectively. In the vertical direction, one escape exit is disposed above the front axle 15, and the other escape exit is disposed between the hinge turntable 13 and the rear axle 14. In case of danger, the two escape exits are in favor of dispersing passengers and allow passengers to quickly escape from danger.

In some embodiments, the front carriage floor 21b and the rear carriage floor 22b are configured as having low-floor structures. A front door 211 and a middle door 212 are provided on the front carriage body 21b. A rear door 213 is provided on the rear carriage body 22b. A step height of the front door is 392 mm, and a step height of the middle door 212 is 390 mm, same with that of the rear door 213. The low-floor structure may facilitate passengers to move in the carriage.

In some embodiments, a kneeling button is located in the front carriage body 21a for kneeling at the front door 211, which facilitates the passengers to get on or get off. In some embodiments, an electric drive plate is disposed at the front door 211, and the electric drive plate is configured to be inclined and extended from the front carriage floor 21b towards the ground at an extension position. In some embodiments, the electric drive plate may be disposed in a folded manner. By providing the electric drive plate, it is convenient to move a wheelchair and a pram into the bus 100, which is more humane.

Figure 4:
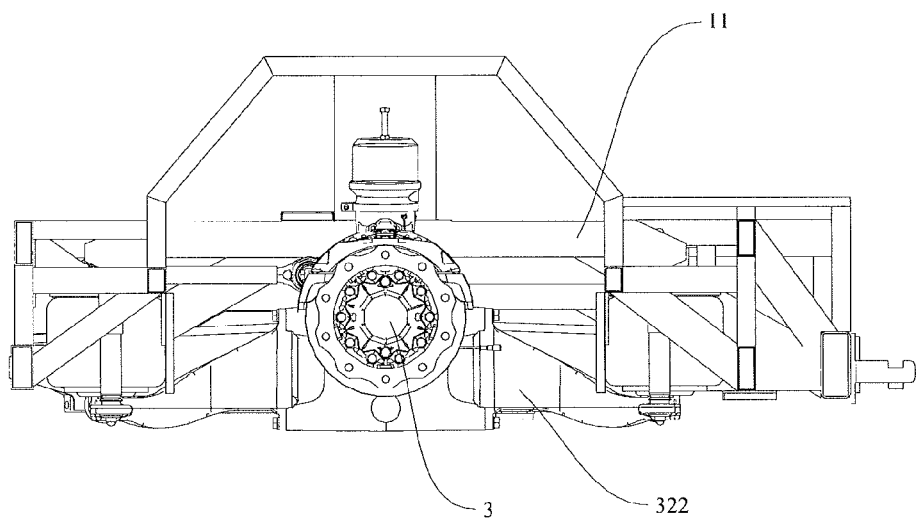
FIG. 4 is a schematic view of a middle axle of a bus according to an embodiment of the present disclosure.
Figure 5:
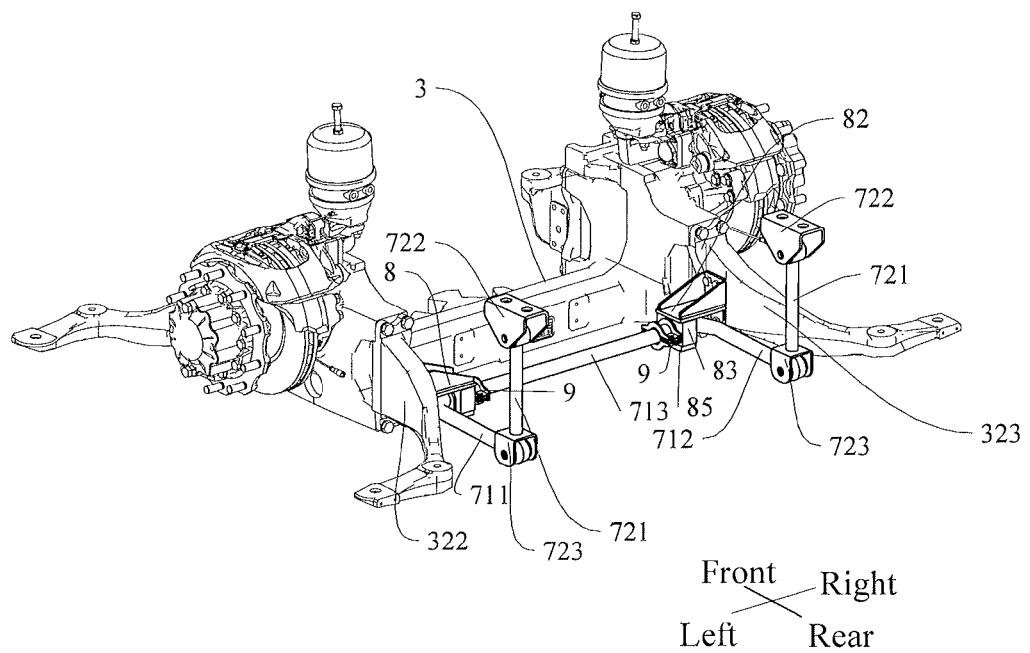
FIG. 5 is a perspective view of a middle axle of a bus according to an embodiment of the present disclosure.

In some embodiments, as shown in FIGS. 4 and 5, the middle axle 3 includes a left axle arm 322 and a right axle arm 323 disposed at two opposite ends thereof respectively. The middle axle 3 further includes a stabilizer rod 7, and the stabilizer rod 7 is an auxiliary elastic member of a suspension system of the bus 100. The stabilizer rod 7 is disposed on the middle axle 3 and the frame assembly 1 and configured to ensure the comfort and driving stability of the bus 100. When the bus 100 is turning, the bus's body is going to be inclined, and the left axle arm 322 and the right axle arm 323 are deformed differently, then the stabilizer rod 7 functions as a leverage to make deformations of the left axle arm 322 and the right axle arm 323 nearly equal, so as to reduce the incline and vibration of the bus's body and improve the driving stability of the bus 100.

Figure 6:
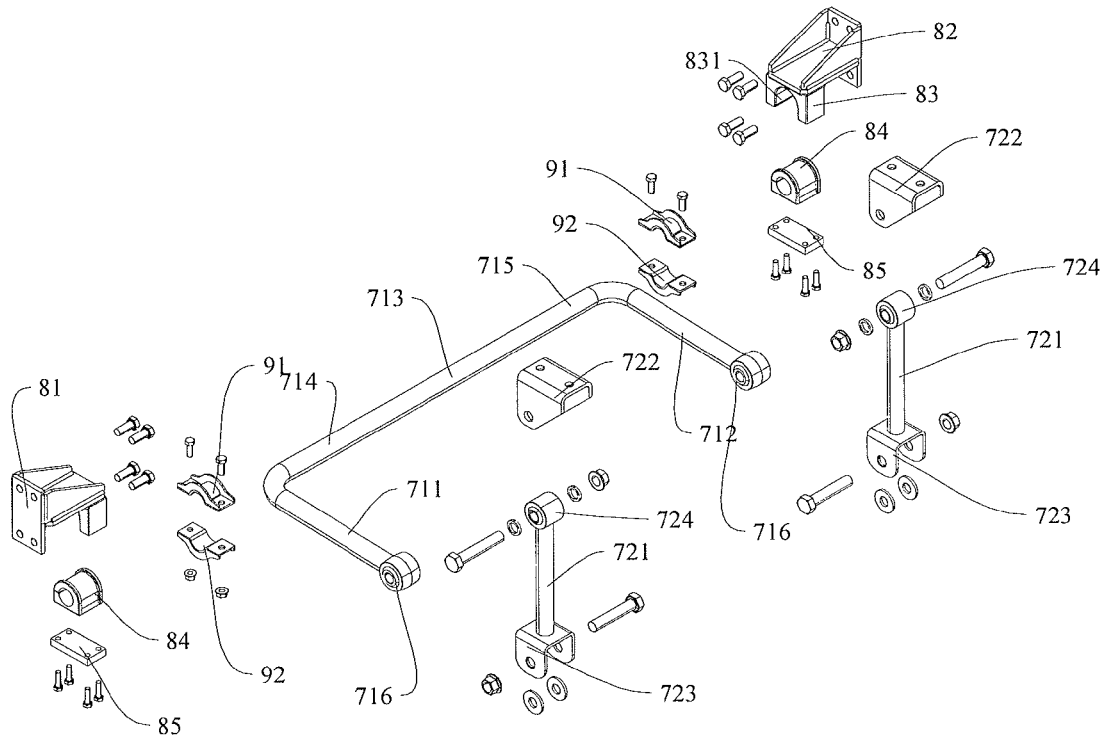
FIG. 6 is an exploded view of a stabilizer rod and parts for mounting the stabilizer rod according to an embodiment of the present disclosure.

In some embodiments, as shown in FIGS. 5 and 6, the stabilizer rod 7 includes a rod body 71 and two booms 72. The rod body 71 includes a left rod body 711, a right rod body 712 and a connecting part 713 connected between the left rod body 711 and the right rod body 712. The rod body 71 has a U-shaped horizontal projection. A left portion 714 of the connecting part 713 adjacent to the left rod body 711 is connected to the left axle arm 322 and a right portion 715 of the connecting part 713 adjacent to the right rod body 713 is connected to the right axle arm 323. In some embodiments, the left axle arm 322 and the right axle arm 323 are connected by the rod body 71. On a rough road, elastic deformations of the left axle arm 322 and the right axle arm 323 are not equal, and the stabilizer rod 7 functions as the leverage to make the elastic deformations of the left axle arm 322 and the right axle arm 323 nearly equal, so as to improve the driving stability of the bus 100.

In some embodiments, lower ends of the two booms 72 are connected to free ends of the left rod body 711 and the right rod body 712 respectively, and upper ends of the two booms 72 are connected to the frame assembly 1. It may be understood that the free ends of the left rod body 711 and the right rod body 712 are ends thereof away from the connecting part 713 respectively. In some embodiments, the upper ends of the two booms 72 may be directly welded to the frame assembly 1, so that the two booms 72 are fixed relative to the frame assembly 1, and the two booms 72 fix the rod body 71 in the vertical direction so as to avoid the shift and offset of the rod body 71 in the vertical direction during the driving of the bus 100.

With the bus 100 according to embodiments of the present disclosure, by disposing the rod body 71 on the left axle arm 322 and the right axle arm 323, and connecting the rod body 71 to the frame assembly 1 by the two booms 72, thereby a mounting manner of the stabilizer rod in the related art is changed. That is, in embodiments of the present disclosure, the stabilizer rod 7 is a reversely mounted structure, and thus a minimum point the rod 7 can be raised. In this way, a minimum ground clearance of the bus 100 provided with a low floor can be improved, and a risk of scratching the stabilizer rod 7 can be reduced, thus improving the usage life and safety of the bus 100.

In some embodiments, compared with a layout of the stabilizer rod in the related art, a layout of the stabilizer rod 7 in embodiments of the present disclosure increases a span for fixing the stabilizer rod 7, thereby increasing the inclinable angle of the bus 100.

Figure 7:
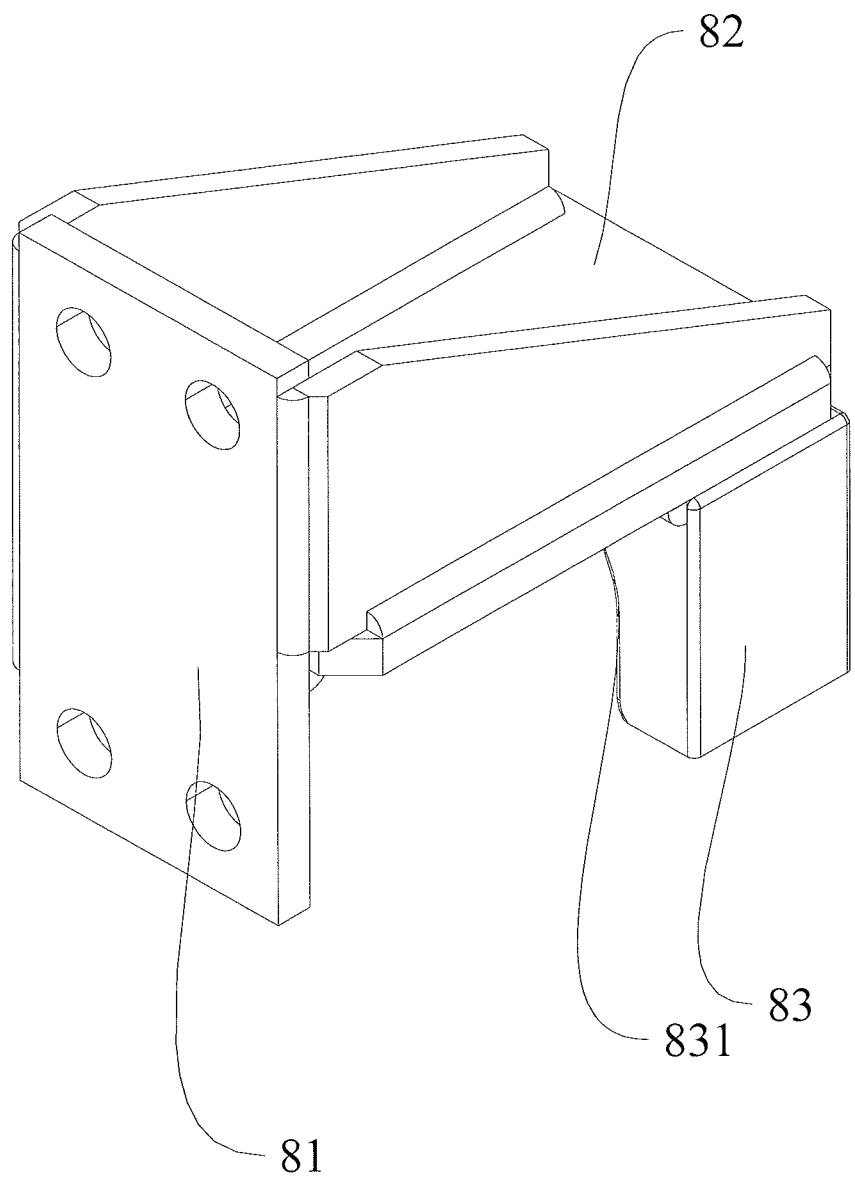
FIG. 7 is a schematic view of a stabilizer rod bracket according to an embodiment of the present disclosure.

In some embodiments, as shown in FIGS. 5, 6 and 7, the bus 100 further includes two stabilizer rod brackets 8. The stabilizer rod bracket 8 includes a vertical mounting plate 81, a horizontal mounting plate 82 and a rod mounting block 83. The vertical mounting plates 81 of the two stabilizer rod brackets 8 are connected to the left axle arm 322 and the right axle arm 323 by bolts respectively. The horizontal mounting plate 82 is vertically connected to the corresponding vertical mounting plate 81. The rod mounting block 83 is disposed under the corresponding horizontal mounting plate 82. The left portion 714 of the connecting part 713 and the right portion 715 of the connecting part 713 are disposed on the corresponding rod mounting blocks 83 respectively. The rod mounting block 83 has a mounting groove 831 with a U-shaped downward opening, and the left portion 714 of the connecting part 713 and the right portion 715 of the connecting part 713 are disposed in the corresponding mounting grooves 831 respectively. The stabilizer rod 7 is fixed by the left axle arm 322 and the right axle arm 323 with the stabilizer rod bracket 8, and thus the ground clearance of the stabilizer rod 7 is improved.

Furthermore, the bus 100 further includes two rubber bushings 84 and two holders 85. The two rubber bushings 84 are fitted over the left portion 714 of the connecting part 713 and the right portion 715 of the connecting part 713 and received within the corresponding mounting grooves 831 respectively. On one hand, a shape of the rubber bushing 84 is adapted to match a shape of the connecting part 713, so as to improve the mounting stability between the connecting part 713 and the rod mounting block 83. On the other hand, the rubber bushing 84 is made of rubber, so it can function as a buffer to protect the mounting groove 831 and the connecting part 713 well.

In some embodiments, the two holders 85 are connected to bottoms of the corresponding rod mounting blocks 83 by bolts and configured to fix the rubber bushings 84 within the mounting grooves 831. The rubber bushing 84 has a U shape and defines a closed fixing space together with the holder 85, and thus the mounting groove 831 and the holder 85 can fix the stabilizer rod 7 provided with the rubber bushing 84.

Figure 8:
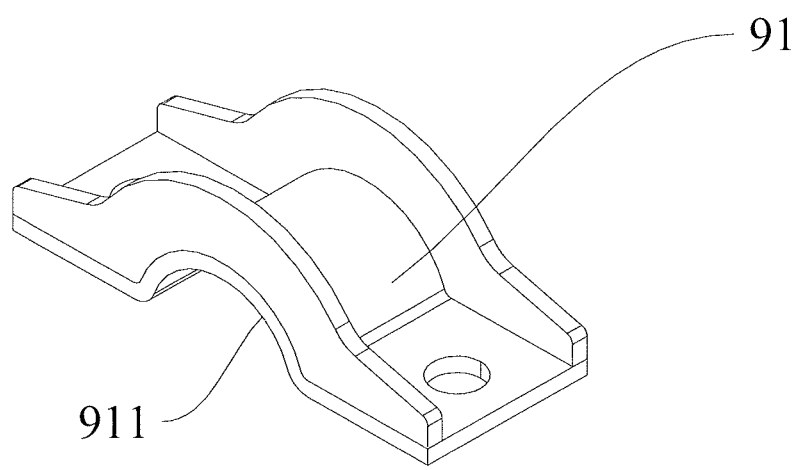
FIG. 8 is a schematic view of a fixing clip according to an embodiment of the present disclosure.
Figure 8:
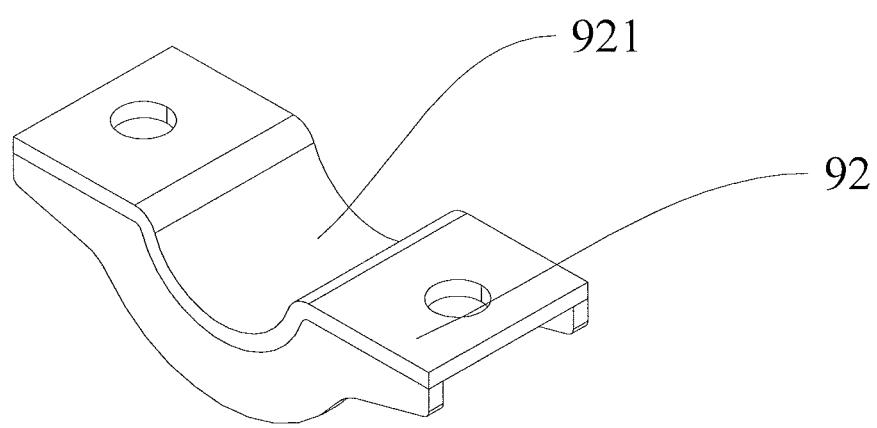

In some embodiments, as shown in FIGS. 5, 6 and 8, the bus 100 further includes two fixing clips 9. The fixing clips 9 are disposed on the left portion 714 of the connecting part 713 and the right portion 715 of the connecting part 713 respectively, and the two fixing clips 9 are adapted to fit with the rod mounting blocks 83 to limit a freedom degree of the rod body 71 in the lateral direction.

In some embodiments, the fixing clip 9 includes an upper fixing clip part 91 and a lower fixing clip part 92. The upper fixing clip part 91 is disposed on an upper side of the connecting part 713, and has an upper positioning groove 911 with a downward opening. The lower fixing clip part 92 is disposed on a lower side of the connecting part 713, and has a lower positioning groove 921 with an upward opening. As shown in FIG. 8, shapes of the upper fixing clip part 91 and the lower fixing clip part 92 are the same with each other. Furthermore, each of the shapes of the upper fixing clip part 91 and the lower fixing clip part 92 is configured as a semicircle. Thus, the rod body 71 is limited by the upper fixing clip part 91, the lower fixing clip part 92 and the rod mounting block 83, and each of shapes of the upper positioning groove 911 and the lower positioning groove 921 is configured as a semicircle, so that the upper positioning groove 911 and the lower positioning groove 921 are adapted to fit with the connecting part 713 so as to avoid the offset of the stabilizer rod 7 in the lateral direction.

In some embodiments, the upper fixing clip part 91 and the lower fixing clip part 92 may be connected to each other by flange self-locking nuts and bolts, which improves the connection stability of the upper fixing clip part 91 and the lower fixing clip part 92.

In some embodiments, as shown in FIGS. 5 and 6, the boom 72 includes a boom body 721, a frame connecting bracket 722 and a boom connecting bracket 723. The frame connecting bracket 722 is detachably connected to an upper end of the boom body 721. The frame connecting bracket 722 may be welded with the frame assembly 1. That is, the frame connecting bracket 722 is fixed with the frame assembly 1, but detachably connected to the boom body 721. The frame connecting bracket 722 may be connected to the boom body 721 by bolts, which facilitates the mounting and maintenance of the boom body 721.

In some embodiments, as shown in FIG. 6, a first mounting tube 724 is disposed on the upper end of the boom body 721, and an axis of the first mounting tube 724 is perpendicular to an axis of the boom body 721, and the frame connecting bracket 722 is connected to the first mounting tube 724 by bolts. In some embodiments, the frame connecting bracket 722 has a first mounting lug disposed on each of left and right sides thereof. The frame connecting bracket 722 is placed on the first mounting tube 724 and fitted therewith, and a bolt is sequentially passed through the first mounting lug, the first mounting tube 724, and the other first mounting lug from left to right (or from right to left), thus improving the mounting stability and convenience of the frame connecting bracket 722.

In some embodiments, the connecting bracket 722 and the first mounting tube 724 are connected to each other by Spiralock nuts and bolts, thereby improving the connecting stability of the frame connecting bracket 722 and the first mounting tube 724.

In some embodiments, the boom connecting brackets 723 are fixed on lower ends of the boom body 721 and detachably connected to the free ends of the left rod body 711 and the right rod body 712 respectively. In some embodiments, the free ends of the left rod body 711 and the right rod body 712 are the ends thereof away from the connecting part 713 respectively. In some embodiments, the boom connecting bracket 723 may be directly welded to the boom body 721, or the boom connecting bracket 723 and the boom body 721 may be formed integrally, thus resulting in a simple and stable structure. In some embodiments, connections between the boom connecting bracket 723 and the left rod body 711 and between the boom connecting bracket 723 and the right rod body 712 are detachable. In other words, the boom connecting bracket 723 may be connected to the rod body 71 with bolts.

In some embodiments, as shown in FIG. 6, a second mounting tube 716 is disposed at the free end of each of the left rod body 711 and the right rod body 712. An axis of the second mounting tube 716 is perpendicular to an axis of the left rod body 711 and an axis of the right rod body 712 respectively, and the boom connecting bracket 723 is connected to the second mounting tube 716 by bolts. In some embodiments, the boom connecting bracket 723 has a second mounting lug disposed on each of the left and right sides of the boom connecting bracket 723 respectively. The boom connecting bracket 723 is placed on the second mounting tube 716 and fitted therewith, and a bolt is sequentially passed through the second mounting lug, the second mounting tube 716, and the other second mounting lug from left to right (or from right to left), thus improving the mounting stability and convenience of the boom connecting bracket 723.

In some embodiments, the boom connecting bracket 723 and the second mounting tube 716 are connected to each other by Spiralock nuts and bolts, thereby improving the connecting stability of the boom connecting bracket 723 and the second mounting tube 724.

In some embodiments, other structures and principles of the bus 100, such as a principle of the battery driving the motor 12, the hinge turntable's structure or connecting structures between the hinge turntable 13 and the front frame 15 and between the hinge turntable 13 and the rear frame 12 are well known to those skilled in the related art, and thus details thereof are omitted herein.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:
1. A bus, comprising:
   a frame assembly comprising a front frame, a rear frame and a hinge turntable disposed between the front frame and the rear frame;
   carriages comprising a front carriage disposed on the front frame and a rear carriage disposed on the rear frame, the front carriage having a front carriage body and a front carriage floor, and the rear carriage having a rear carriage body and a rear carriage floor;
   a front axle disposed at a bottom of the front frame, front wheels being disposed at two opposite ends of the front axle respectively;

a middle axle disposed at the bottom of the front frame, middle wheels being disposed at two opposite ends of the middle axle respectively;

a rear axle disposed at a bottom of the rear frame, rear wheels being disposed at two opposite ends of the rear axle respectively;

a first group of battery packs comprising a first battery pack disposed within a rear cabin in the rear of the rear carriage body and a second battery pack disposed on the rear frame;

a second group of battery packs disposed on upper surfaces of top roof of the front carriage body and the rear carriage body;

a third group of battery packs disposed on the front carriage floor and between the front axle and the hinge turntable.

2. The bus of claim 1, wherein the first battery pack comprises eight battery modules arranged in two layers in a vertical direction and in four columns in a lateral direction.

3. The bus of claim 1, wherein the second battery pack is located near the rear axle and under a last row of seats in the rear carriage, and the second battery pack comprises twelve battery modules arranged in four columns in a lateral direction and in three rows in a longitudinal direction.

4. The bus of claim 1, wherein the second group of battery packs comprises:
 a third battery pack disposed on a part of the top roof of the front carriage body right above the middle axle; and
 a fourth battery pack disposed on a part of the top roof of the rear carriage body which is between the hinge turntable and the rear axle and is adjacent to the hinge turntable.

5. The bus of claim 4, wherein the third battery pack comprises sixteen battery modules arranged in four columns in the lateral direction and in four rows in the longitudinal direction; and
 the fourth battery pack comprises eight battery modules arranged in four columns in the lateral direction and in two rows in the longitudinal direction.

6. The bus of claim 4, wherein the third battery pack and the fourth battery pack are covered by a battery pack cover.

7. The bus of claim 1, wherein the third group of battery packs comprises:
 a fifth battery pack disposed right above the front axle; and
 a sixth battery pack disposed between the hinge turntable and the middle axle.

8. The bus of claim 7, wherein the fifth battery pack comprises:
 a left battery pack disposed above the front wheel at the left, and comprising four battery modules arranged in two rows in the longitudinal direction and in two layers in the vertical direction; and
 a right battery pack disposed above the front wheel at the right, and comprising three battery modules arranged in three rows in the longitudinal direction.

9. The bus of claim 7, wherein the sixth battery pack comprises:
 eight battery modules symmetrically disposed behind a last row of seats in the front carriage with respect to a longitudinal centerline of the bus, and four battery modules of which are being arranged on each side of the longitudinal centerline of the bus in the vertical direction.

10. The bus of claim 1, further comprising:
two refrigeration systems, one of which being disposed on the upper surface of the top roof of the front carriage body and between the front axle and the middle axle, and the other of which being disposed on the upper surface of the top roof of the rear carriage body and being above the rear axle.

11. The bus of claim 1, wherein the middle axle comprises a left axle arm and a right axle arm disposed on the two ends of the middle axle respectively, and the bus further comprises a stabilizer rod disposed on the middle axle and the frame assembly, and the stabilizer rod comprises:
 a rod body having a U-shaped horizontal projection and comprising a left rod body, a right rod body and a connecting part connected between the left rod body and the right rod body, wherein a left portion of the connecting part adjacent to the left rod body is connected to the left axle arm and a right portion of the connecting part adjacent to the right rod body is connected to the right axle arm; and
 two booms having lower ends connected to free ends of the left rod body and the right rod body respectively and upper ends connected to the frame assembly.

12. The bus of claim 11, further comprising two stabilizer rod brackets, wherein each stabilizer rod bracket comprises:
 a vertical mounting plate connected to the left axle arm or the right axle arm;
 a horizontal mounting plate vertically connected to the vertical mounting plate; and
 a rod mounting block disposed under the horizontal mounting plate, the left portion of the connecting part or the right portion of the connecting part being disposed on the rod mounting block.

13. The bus of claim 12, wherein the rod mounting block defines a U-shaped mounting groove having a downward opening, and the left portion of the connecting part or the right portion of the connecting part is disposed within the mounting groove.

14. The bus of claim 13, further comprising:
 two rubber bushings fitted over the left portion of the connecting part and the right portion of the connecting part and received within the corresponding mounting grooves respectively; and
 two holders connected to bottoms of the corresponding rod mounting blocks respectively and configured to fix the rubber bushings within the mounting grooves.

15. The bus of claim 12, further comprising
 two fixing clips disposed on the left portion of the connecting part and the right portion of the connecting part respectively and adapted to fit with the rod mounting blocks to limit a freedom degree of the rod body in the lateral direction.

16. The bus of claim 15, wherein the fixing clip comprises:
 an upper fixing clip part disposed on an upper side of the connecting part and defining an upper positioning groove having a downward opening; and
 a lower fixing clip part disposed on a lower side of the connecting part and defining a lower positioning groove having an upward opening.

17. The bus of claim 16, wherein shapes of the upper fixing clip part and the lower fixing clip part are the same and the shape is configured as a semicircle.

18. The bus of claim 16, wherein the boom comprises:
 a boom body;
 a frame connecting bracket detachably connected to an upper end of the boom body and welded with the frame assembly;

a boom connecting bracket fixed on a lower end of the boom body and detachably connected to the free end of the left rod body or the right rod body.

19. The bus of claim 18, wherein
a first mounting tube is disposed on the upper end of the boom body, an axis of the first mounting tube is perpendicular to an axis of the boom body, and the frame connecting bracket is connected to the first mounting tube.

20. The bus of claim 18, wherein
a second mounting tube is disposed at the free end of each of the left rod body and the right rod body, an axis of the second mounting tube is perpendicular to an axis of the left rod body and an axis of the right rod body respectively, and the boom connecting bracket is connected to the second mounting tube.

* * * * *